(No Model.) 2 Sheets—Sheet 1.
H. BENROTH.
REEL FOR GRAIN BINDERS.

No. 507,255. Patented Oct. 24, 1893.

Witnesses
Wm R. Blackwood
R. F. Hock

Inventor
Henry Benroth
by Blackwood Bro
his Attorneys (No Model.) 2 Sheets—Sheet 2.

H. BENROTH.
REEL FOR GRAIN BINDERS.

No. 507,255. Patented Oct. 24, 1893.

Witnesses
Wm R Blackwood
R. F. Heck

Inventor
Henry Benroth
by Blackwood Bros
his Attorneys

UNITED STATES PATENT OFFICE.

HENRY BENROTH, OF PUTNAM COUNTY, OHIO.

REEL FOR GRAIN-BINDERS.

SPECIFICATION forming part of Letters Patent No. 507,255, dated October 24, 1893.

Application filed October 14, 1892. Serial No. 448,922. (No model.)

*To all whom it may concern:*

Be it known that I, HENRY BENROTH, a citizen of the United States of America, residing in the county of Putnam and State of Ohio, have invented a new and useful Improvement in Harvester-Reels; and I do declare the following to be a full, clear, and exact description of the invention, such as will enable others skilled in the art to which it appertains to make and use the same.

My invention relates to an improvement in harvester reels for automatically raising and delivering grain; and more especially to raising and presenting "down" grain to a harvester in a proper position to be acted upon by the cutters, and holding it until cut, then automatically releasing it and allowing it to fall on the platform or elevator.

The object of my invention is to provide a reel which is simple and inexpensive in construction and easy and effective in operation. It is illustrated in the accompanying drawings in which—

Figure 1:
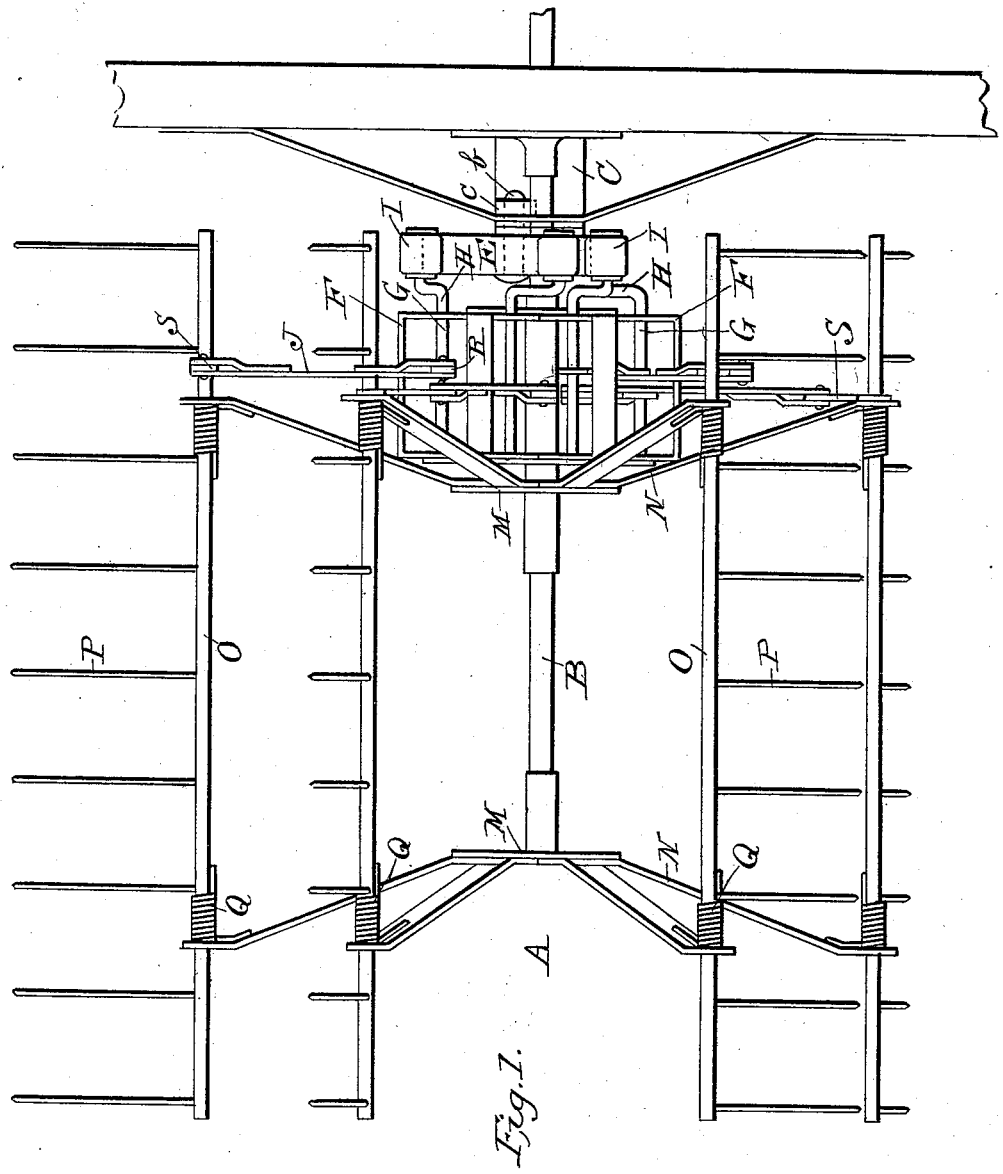
Figure 2:
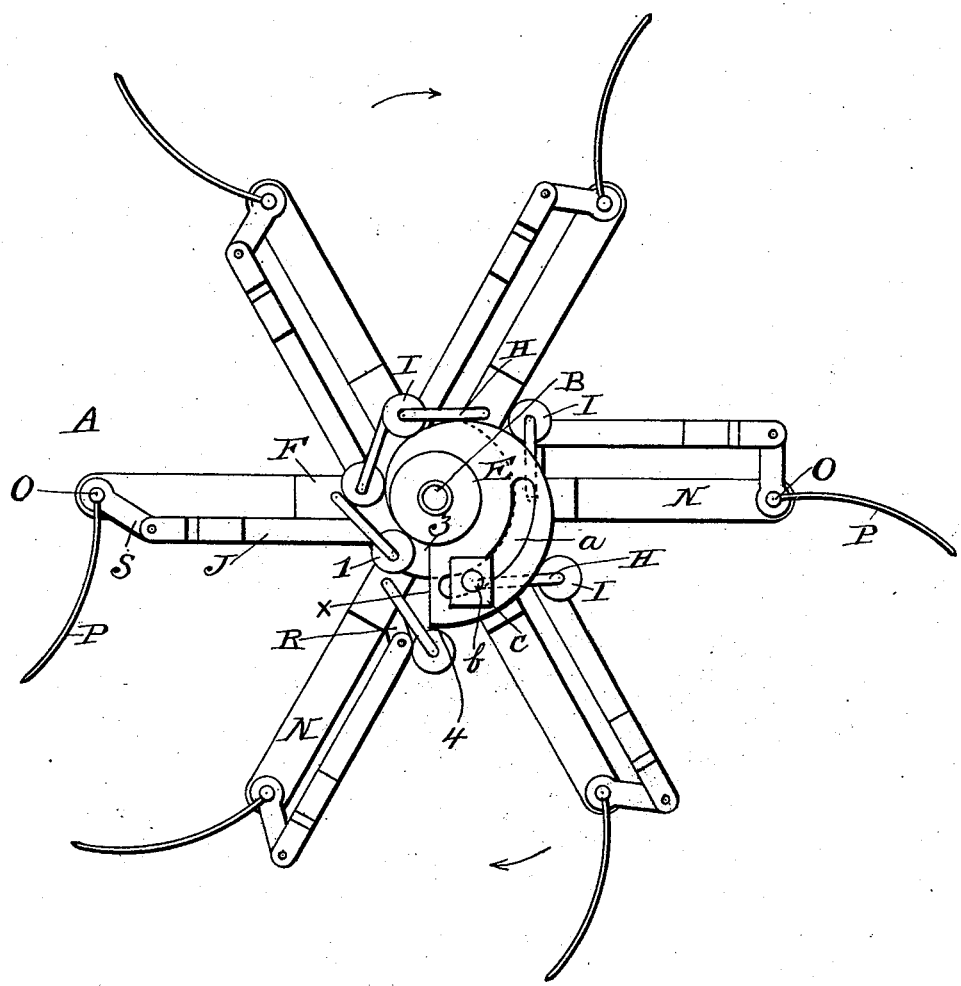

Figure 1, is a plan view, and Fig. 2, an end elevation.

In the accompanying drawings in which like letters and numerals of reference denote like parts: A is the reel, B the reel shaft adapted to revolve above the platform and in front of the cutter in the usual manner and which receives its power from the gear of the harvester in any well known manner, said shaft being properly journaled in bracket C, which is secured to the harvester.

E is a cam provided with a plain surface $x$, on its periphery, and an elongated slot $a$ in its face, said cam being loosely mounted on the reel shaft B and supported by the bracket C, being secured thereto by a bolt $b$, passing through the elongated slot in the cam and into a hole in the bracket C and having a nut, $c$ screwed firmly upon its inner end. Through the medium of the elongated slot $a$, and the bolt and nut, the cam can be adjusted and held in any desired position.

F is a frame-work journaled on the shaft B and serves as a bearing for the spindles G, the inner ends of which terminate in crank arms H and carry friction rollers I adapted to revolve on the cam.

M are collars journaled on the shaft B having radial arms N, the outer ends of which are provided with orifices to receive the shafts O which project a short distance beyond the arms, and carry fingers or pickers P thereon.

Q are springs the outer ends of which are secured to the radial arms N and the inner ends to the shafts O. These springs are for the purpose of forcing the friction rollers on to the plain surface of the cam, thus allowing the pickers to turn and drop. J are arms to the opposite ends of which are pivotally connected levers R and S, the levers R on the inner end of the levers being rigid on the spindles G; and the levers S on the outer ends on the shafts O.

The operation is as follows:—By reference to Fig. 2 of the drawings it will be plainly obvious that when motion is imparted to shaft B, the reel will revolve in the direction indicated by the arrows and cause the rollers on the crank arms to revolve and travel around the cam thus turning the spindles, and they being connected to the shafts carrying the pickers or fingers, by the arms and levers cause the said shafts to revolve. By reason of the construction and arrangement of parts hereinbefore described, when the roller 1 starts around the cam from the point 3 it will gradually turn the shaft O, through the medium of the crank shafts H, spindles G, arms J, and levers R and S; and cause the fingers carried by the shafts O to turn, and as the curvature of the cam gradually increases from the point 3 to the point 4, the spindles G are gradually kept turning until the rollers reach the point 4 when they are forced onto the plain surface by the springs Q and thereby cause the pickers or fingers to drop. The pickers or fingers can be regulated by adjusting the cam so as to pick up and deliver the grain at any point.

Having thus described my invention, what I claim as new, and desire to secure by Letters Patent, is—

In a harvester reel the combination of the main shaft, the sleeves mounted thereon provided with collars, the laterally projecting radial arms rigidly attached to said collars, the shafts having curved pickers or fingers, and extending across the reel and mounted in the outer ends of the radial arms and adapted to revolve therein, the spiral springs mounted on and embracing said shafts at or near their opposite ends, one end of each spring fixed to one of the shafts, and the other end to one of
5 the radial arms; with the independent framework mounted on the inner end of the main shaft and abutting against and partially embraced by the radial arms, the crank spindles mounted in said framework carrying friction
10 rollers, the levers and links for connecting the shafts with the said crank spindles, the cam with a straight surface on its periphery, a curved slot in its face, and a bolt and nut to secure it to the harvester, substantially as described.

HENRY BENROTH.

Witnesses:
SIDNEY SANDERS,
THOMAS V. MYERS.